United States Patent
Noda et al.

(10) Patent No.: US 9,225,818 B2
(45) Date of Patent: Dec. 29, 2015

(54) MOBILE TERMINAL

(75) Inventors: Masahide Noda, Kawasaki (JP); Naoki Nishiguchi, Kawasaki (JP); Noboru Iwamatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 463 days.

(21) Appl. No.: 13/428,045

(22) Filed: Mar. 23, 2012

(65) Prior Publication Data

US 2012/0252536 A1 Oct. 4, 2012

(30) Foreign Application Priority Data

Mar. 30, 2011 (JP) .................. 2011-076755

(51) Int. Cl.
*H04M 1/725* (2006.01)
*G09G 5/373* (2006.01)
*G09G 5/397* (2006.01)

(52) U.S. Cl.
CPC ........... *H04M 1/72519* (2013.01); *G09G 5/373* (2013.01); *G09G 5/397* (2013.01)

(58) Field of Classification Search
None
See application file for complete search history.

(56) References Cited

U.S. PATENT DOCUMENTS

| 5,060,170 | A | * | 10/1991 | Bourgeois et al. ............ 715/788 |
| 5,745,095 | A | * | 4/1998 | Parchem et al. .............. 345/633 |
| 8,209,408 | B1 | * | 6/2012 | Huang et al. ................. 709/223 |
| 2009/0170565 | A1 | | 7/2009 | Okuda et al. |
| 2009/0303204 | A1 | * | 12/2009 | Nasiri et al. ................. 345/184 |
| 2011/0145833 | A1 | * | 6/2011 | De Los Reyes et al. ...... 718/106 |
| 2011/0154328 | A1 | * | 6/2011 | Mo et al. ......................... 718/1 |

FOREIGN PATENT DOCUMENTS

| JP | 62-127790 | 6/1987 |
| JP | 2006-146756 | 6/2006 |
| JP | 2010-191681 | 9/2010 |
| WO | WO 2007/111112 | 10/2007 |

OTHER PUBLICATIONS

Brian, Virtualization on Mobile Devices: What's Taking So Long?, meshIP Blog http://meship.com/Blog/2011/02/24/virtualization-on-mobile-devices-whats-taking-so-long/.*
Japanese Office Action dated Sep. 9, 2014 in corresponding Japanese Patent Application No. 2011-076755.

* cited by examiner

*Primary Examiner* — Kee M Tung
*Assistant Examiner* — Xin Sheng
(74) *Attorney, Agent, or Firm* — Staas & Halsey LLP

(57) ABSTRACT

A mobile terminal includes a display device and a processor. The processor acquires first display information about a first virtual machine. The first display information does not prompt a user operation. The processor displays the acquired first display information in a first display area on the display device. The processor acquires second display information about the first virtual machine. The second display information prompts a user operation. The processor displays the acquired second display information in a second display area on the display device. The processor determines, in response to an instruction for changing display, whether mixed display is allowed by referencing status information. The processor acquires, when the mixed display is allowed, third display information about a second virtual machine. The third display information does not prompt a user operation. The processor displays the acquired third display information in a third display area on the display device.

6 Claims, 15 Drawing Sheets

| GUEST OS | NEXT OS | STATUS NOTIFICATION AREA |
|---|---|---|
| GUEST A | GUEST B | BEING DISPLAYED |
| GUEST B | GUEST A | DISPLAY POSSIBLE |

| GUEST OS | NEXT OS | STATUS NOTIFICATION AREA |
|---|---|---|
| GUEST A | GUEST B | DISPLAY POSSIBLE |
| GUEST B | GUEST A | BEING DISPLAYED |

FIG. 4

| GUEST OS | ENTIRE SCREEN | | | STATUS NOTIFICATION AREA | |
|---|---|---|---|---|---|
| | SOURCE ADDRESS | TRANSFER SIZE | DESTINATION ADDRESS | RECTANGLE START POINT | RECTANGLE SIZE |
| GUEST A | FB_A | ScreenSize | Lcd_top | (StXa,StYa) | StWa×StHa |
| GUEST B | FB_B | ScreenSize | Lcd_top | (StXb,StYb) | StWb×StHb |

FIG. 6

| GUEST OS | ENTIRE SCREEN ||| STATUS NOTIFICATION AREA |||
|---|---|---|---|---|---|---|
| | SOURCE ADDRESS | TRANSFER SIZE | DESTINATION ADDRESS | SOURCE ADDRESS | TRANSFER SIZE | DESTINATION ADDRESS |
| GUEST A | FB_A | ScreenSize | Lcd_top | FB_A+StatA | StatSizeA | Lcd_top+StatA |
| GUEST B | FB_B | ScreenSize | Lcd_top | FB_B+StatB | StatSizeB | Lcd_top+StatB |

FIG. 8

| GUEST OS | ENTIRE SCREEN | | | STATUS NOTIFICATION AREA | | |
|---|---|---|---|---|---|---|
| | SOURCE ADDRESS | TRANSFER SIZE | DESTINATION ADDRESS | SOURCE ADDRESS | TRANSFER SIZE | DESTINATION ADDRESS |
| GUEST A | FB_A | ScreenSize | Lcd_top | FB_A | StatSize | Lcd_top |
| GUEST B | FB_B | ScreenSize | Lcd_top | FB_B | StatSize | Lcd_top |

FIG. 10

| GUEST OS | ENTIRE SCREEN | | | STATUS NOTIFICATION AREA | | |
|---|---|---|---|---|---|---|
| | SOURCE ADDRESS | TRANSFER SIZE | DESTINATION ADDRESS | SOURCE ADDRESS | TRANSFER SIZE | DESTINATION ADDRESS |
| GUEST A | FB_A | ScreenSize | Lcd_top | FB_A | StatSizeA | Lcd_top |
| GUEST B | FB_B | ScreenSize | Lcd_top | FB_B | StatSizeB | Lcd_top |

FIG. 12

| GUEST OS | ENTIRE SCREEN ||| STATUS NOTIFICATION AREA |||
|---|---|---|---|---|---|---|
| | SOURCE ADDRESS | TRANSFER SIZE | DESTINATION ADDRESS | SOURCE ADDRESS | TRANSFER SIZE | DESTINATION ADDRESS |
| GUEST A | FB_A | ScreenSize | Lcd_top | FB_A | StatSizeA | Lcd_top |
| GUEST B | FB_B | ScreenSize | Lcd_top | FB_B+ScreenSize-StatSizeB | StatSizeB | Lcd_top+ScreenSize-StatSizeB |

MOBILE TERMINAL

CROSS-REFERENCE TO RELATED APPLICATION

This application is based upon and claims the benefit of priority of the prior Japanese Patent Application No. 2011-076755, filed on Mar. 30, 2011, the entire contents of which are incorporated herein by reference.

FIELD

The embodiments discussed herein are related to a mobile terminal.

BACKGROUND

In recent years, a so-called virtual machine (VM) is being used, which is a virtualization technique that allows a plurality of operating systems (OSs) to run on a single computer. For example, the virtualization technique is applied to servers to allow services hitherto provided by a plurality of servers running different OSs to be provided by a single server. Consequently, the cost of system construction and electric power consumption may be reduced as compared with the case of providing services by a plurality of servers.

The virtualization technique is also applied to client devices such as a personal computer (PC) to provide client behaviors corresponding to a plurality of people on a single PC. This enables a reduction in cost and electric power consumption as in the case of applying the virtualization technique to servers. In this way, the virtualization technique that enables a reduction in cost and electric power consumption is used in a variety of fields.

Japanese Laid-open Patent Publication No. 62-127790, Japanese Laid-open Patent Publication No. 2006-146756, and International Publication Pamphlet No. WO2007/111112 disclose related techniques.

However, in the related art, when the virtualization technique is applied to mobile terminals, switching of virtual machines becomes frequent, leading to poor user-friendliness.

Specifically, a typical mobile terminal displays each of states such as the remaining battery level, the radio wave intensity, and whether there are incoming emails or missed incoming calls in a part (hereinafter, referred to as a status notification area) of the screen. The typical mobile terminal alerts the user of a change in such a state by sound, vibration, or the like. The user having received this alert recognizes that there has been a change in state, checks the status notification area of the mobile terminal, and sees notification details as appropriate.

For example, suppose that a mobile terminal employing the virtualization technique is running an OS (A) and an OS (B) as virtual machines. When the OS (hereinafter, referred to as an accessible OS) on which the user is allowed to operate is the OS (A), the mobile terminal displays the screen of the OS (A) and does not display the screen of the OS (B). Accordingly, the mobile terminal alerts the user by using sound, vibration, or the like when the state of the OS (B) changes. The user having received this alert switches the accessible OS from the OS (A) to the OS (B), and then checks the alerted information. As an example, when the user receives an alert from the OS (B) while viewing a video image on the OS (A), the user has to go through a cumbersome operation of stopping playback of the video image once, switching the accessible OS to the OS (B), and then checking an overview of notification.

SUMMARY

According to an aspect of the present invention, provided is a mobile terminal. The mobile terminal includes a display device and a processor.

The processor starts a first virtual machine and a second virtual machine different from the first virtual machine. The processor acquires first display information about the first virtual machine. The first display information does not prompt a user operation. The processor displays the acquired first display information in a first display area on the display device. The processor acquires second display information about the first virtual machine. The second display information prompts a user operation. The processor displays the acquired second display information in a second display area on the display device. The processor determines, in response to an instruction for changing display, whether mixed display is allowed by referencing status information indicating whether the mixed display is allowed. The mixed display is a display state in which information about one virtual machine is displayed together with information about another virtual machine on the display device. The processor acquires, when the mixed display is allowed, third display information about the second virtual machine. The third display information does not prompt a user operation. The processor displays the acquired third display information in a third display area on the display device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of information stored in a display area table;

FIG. 6 illustrates an example of information stored in a display area table according to a second embodiment;

FIG. 8 illustrates an example of a display area table in a case where status notification areas of guest OSs are the same in size;

FIG. 10 illustrates an example of a display area table in a case where status notification areas of guest OSs are different in size;

FIG. 12 illustrates an example of a display area table in a case where status notification areas of guest OSs are different in both position and size;

DESCRIPTION OF EMBODIMENTS

Hereinafter, a mobile terminal according to the embodiments is described in detail with reference to the drawings. It is to be understood that these embodiments are not intended to be limitative.

First Embodiment

In a first embodiment, switching control of virtual machines executed by a mobile terminal according to the first embodiment, a functional block diagram of the mobile terminal, a processing flow, and advantageous effects are described. The mobile terminal described here is, for example, a terminal such as a smartphone or a typical cell-phone.

[Switching Control of Virtual Machines]

Figure 1:
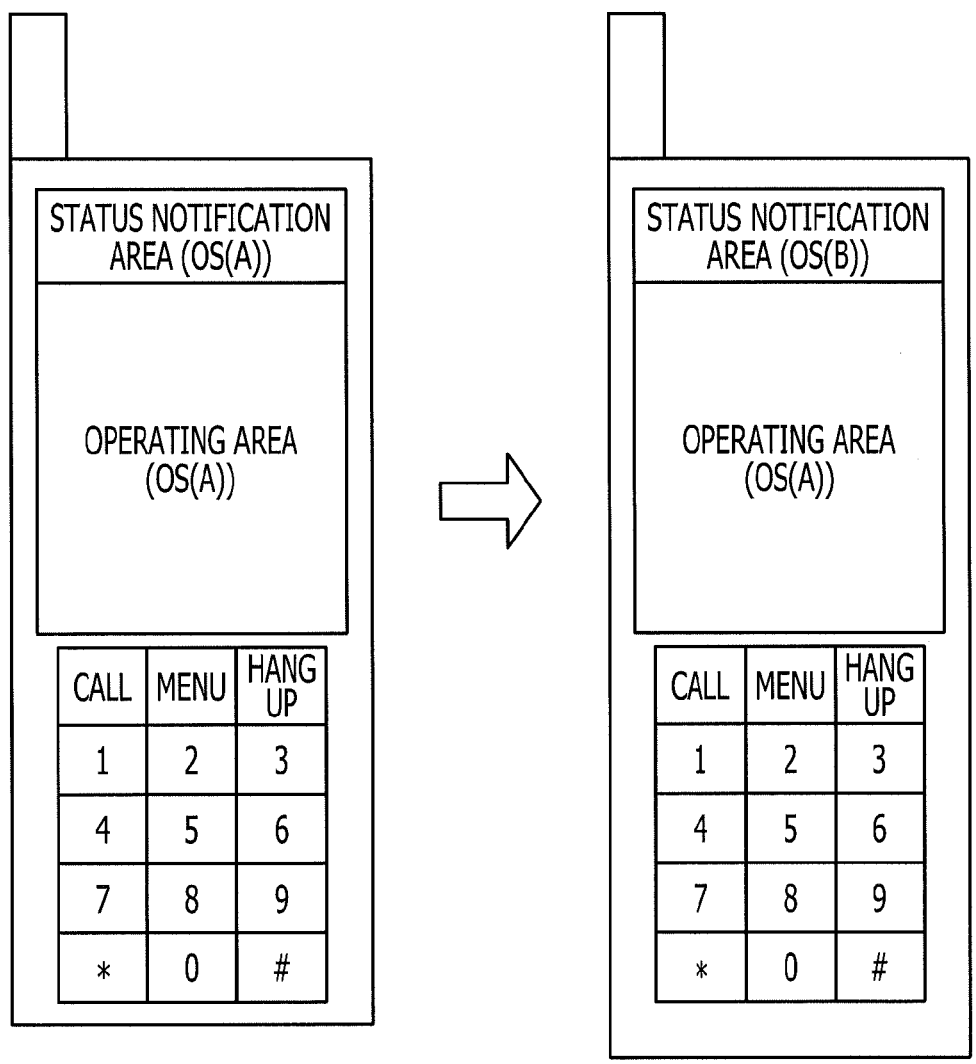
FIG. 1 illustrates switching control of virtual machines executed by a mobile terminal according to a first embodiment.

FIG. 1 illustrates switching control of virtual machines executed by a mobile terminal according to the first embodiment. The mobile terminal according to first embodiment is a terminal that executes virtual machines (VMs) to execute a plurality of operating systems (OSs). While a case where the mobile terminal runs a guest OS (A) and a guest OS (B) is described as an example in this embodiment, this is not intended to restrict the kind or number of OSs.

While running both the guest OS (A) and the guest OS (B), the mobile terminal executes processes corresponding to the respective OSs. For example, the mobile terminal receives an email by an email function provided by the guest OS (A), while receiving an email by an email function provided by the guest OS (B).

In a case where the mobile terminal runs the guest OS (A) as the accessible OS while running each of the guest OSs, the mobile terminal displays information about the guest OS (A) on the display screen as illustrated as the left drawing in FIG. 1. That is, the mobile terminal runs one of the guest OSs designated by a user operation as a main OS, and runs the other OS as a sub-OS.

Specifically, the mobile terminal divides the display screen into an "Operating Area" and a "Status Notification Area", and displays information about the guest OS (A) running as a main OS. For example, the mobile terminal displays information generated in response to a user operation, such as information accepted from an input unit such as a keypad, in the "Operating Area". Also, the mobile terminal displays information which does not prompt a user operation, for example, the remaining battery level, radio wave intensity, and whether there are incoming emails or missed incoming calls, in the "Status Notification Area".

On the other hand, the mobile terminal stores information processed by the guest OS (B) running as a sub-OS into a memory or the like within the mobile terminal. For example, when the guest OS (B) receives an email while information about the guest OS (A) is displayed on a display unit as illustrated as the left drawing in FIG. 1, the mobile terminal stores the email data into the memory or the like.

In this way, the mobile terminal executing a virtual machine acquires first display information from the virtual machine. The first display information is displayed in a first area, e.g., the "Status Notification Area", and does not prompt a user operation. Also, the mobile terminal acquires second display information from the virtual machine. The second display information is displayed in a second area, e.g., the "Operating Area", and may prompt a user operation. Then, the mobile terminal displays the first display information and the second display information on a display device. Upon receiving an instruction to switch displays, the mobile terminal refers to a display state management table. The display state management table records information indicating whether or not mixed display is allowed. The mixed display refers to a display state in which virtual machines whose display information is displayed may differ between the first area and the second area. If the mixed display is allowed, the mobile terminal displays, on the display device, the first display information about a virtual machine that is different from the virtual machine of which the second display information is being displayed on the display device.

As a specific example, suppose that the mobile terminal is displaying information about the guest OS (A) running as the accessible OS, in the "Operating Area" and the "Status Notification Area" as illustrated as the left drawing in FIG. 1. Under this condition, the mobile terminal alerts the user when the guest OS (B) running as a sub-OS receives an email. Thereafter, the mobile terminal displays an icon or the like indicating that the guest OS (B) has received an email, in the "Status Notification Area" of the display, as illustrated as the right drawing in FIG. 1, when the mobile terminal accepts a display switching operation such as a "Menu" button click.

Accordingly, even when an event to be alerted to the user occurs due to processing of an OS that is not the accessible OS, the mobile terminal according to first embodiment may display alert information to the user by a simple user operation without switching OSs. As a result, switching of virtual machines may be reduced also in a case where the virtualization technique is applied to a mobile terminal.

[Configuration of a Mobile Terminal]

Figure 2:
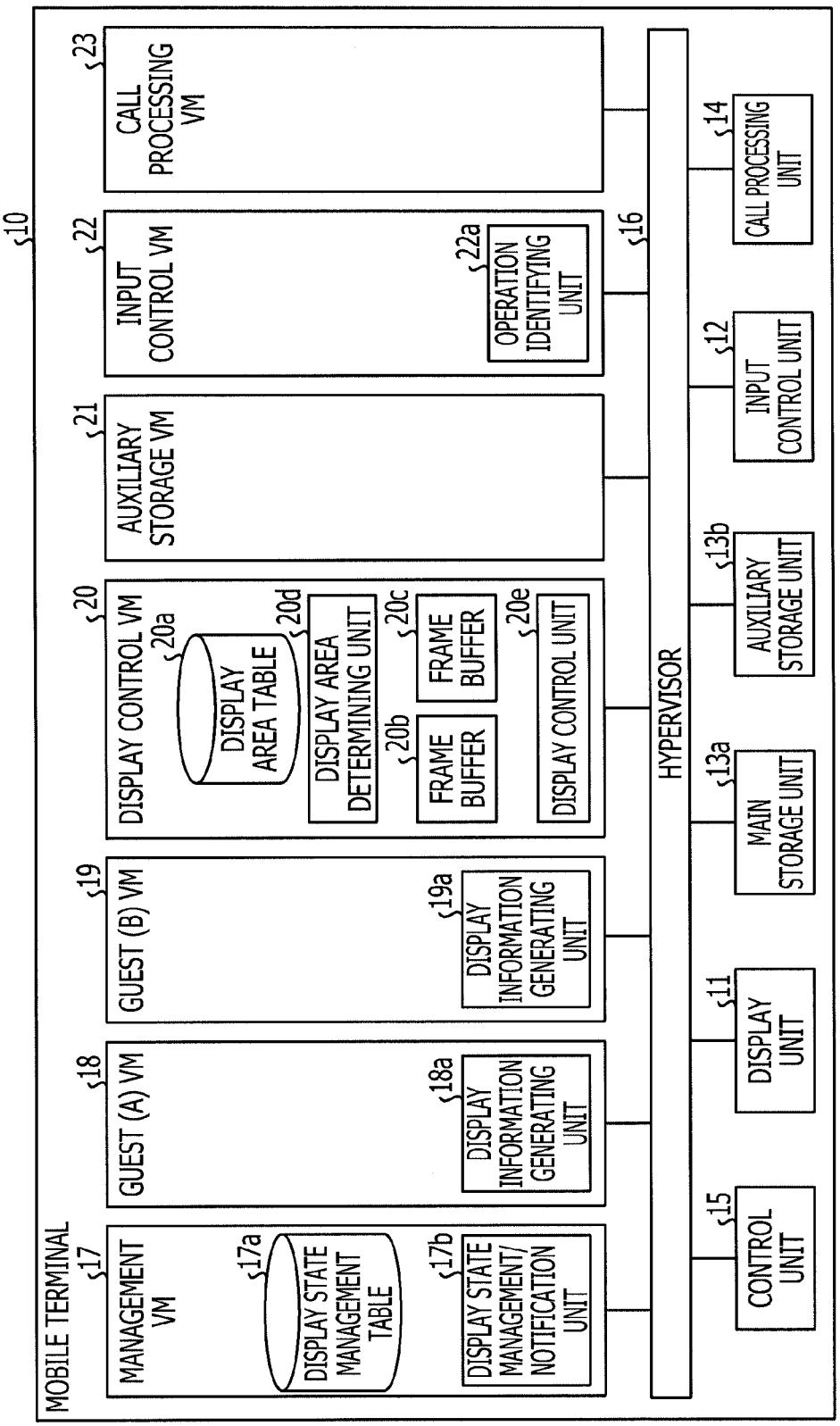
FIG. 2 is a functional block diagram illustrating a configuration of a mobile terminal.

FIG. 2 is a functional block diagram illustrating the configuration of a mobile terminal. As illustrated in FIG. 2, a mobile terminal 10 has a display unit 11, an input control unit 12, a main storage unit 13a, an auxiliary storage unit 13b, a call processing unit 14, a control unit 15, and a hypervisor 16. Further, the mobile terminal 10 has a management VM 17, a guest (A) VM 18, a guest (B) VM 19, a display control VM 20, an auxiliary storage VM 21, an input control VM 22, and a call processing VM 23.

Of these, the display unit 11, the input control unit 12, the main storage unit 13a, the auxiliary storage unit 13b, the call processing unit 14, and the control unit 15 are each a piece of hardware such as an electronic circuit or an integrated circuit. The management VM 17, the guest (A) VM 18, the guest (B) VM 19, the display control VM 20, the auxiliary storage VM 21, the input control VM 22, and the call processing VM 23 are each a virtual machine that is provided by the control unit 15 and the hypervisor 16. The individual processing units are connected to each other via the hypervisor 16. The processing units illustrated here are an example and not limitative.

The display unit 11 is a display device such as a display installed in a typical cell-phone or the like. The display unit 11 displays the results of processing executed by each control unit of the mobile terminal 10. For example, the display unit 11 displays an "Incoming call screen" for when a voice call comes in, an "Outgoing call screen" for when starting a voice call, a "Menu screen" for when selecting a function of the mobile terminal 10, or the like.

The input control unit 12 is an input device such as a keypad installed in a typical cell-phone or the like. The input control unit 12 accepts a user operation, and notifies each control unit of the user operation. The input control unit 12 may also be, for example, a screen like a touch panel in which the display unit 11 and the input control unit 12 are made to cooperate with each other.

The auxiliary storage unit 13b is a storage device that stores a program and the like executed by the mobile terminal 10, and also stores various kinds of information such as a telephone directory, received emails, and sent emails included in a typical cell-phone. A NAND flash memory or the like is given as an example of the auxiliary storage unit 13b, and a random access memory (RAM) or the like is given as an example of the main storage unit 13a.

The call processing unit 14 is a processing unit having a baseband processing unit or the like. The call processing unit 14 is a processing unit for executing a voice call as a cell-phone. Since control units included in the call processing unit 14 are the same as processing units included in a typical cell-phone, a detailed description thereof is omitted.

The control unit 15 is an electronic circuit such as a central processing unit (CPU). The control unit 15 is a processing unit responsible for processing of the entire mobile terminal 10. The control unit 15 executes the hypervisor 16 to run virtual machines (VMs). Also, upon receiving an instruction to alert the user, such as when an email is received from the guest (A) VM 18 or the guest (B) VM 19, the control unit 15 alerts the user by activating vibration or outputting sound.

The hypervisor 16 is a function unit implemented by the control unit 15 by executing a control program. The hypervisor 16 provides a partitioning capability with high independency to each guest OS and VM running at the higher level. For example, the hypervisor 16 assigns, for each VM, a predetermined processing capacity of a processor such as a CPU included in the control unit 15, as a virtual processor to be used by the VM. Also, the hypervisor 16 assigns, for each VM, a predetermined area of the main storage unit 13a as a virtual memory area to be used by the VM. The hypervisor 16 connects individual VMs to each other and controls communication between the VMs. Also, the hypervisor 16 connects individual VMs and individual physical processing units to each other. Likewise, the hypervisor 16 connects individual physical processing units to each other.

The management VM 17 is a virtual machine that executes the overall control of VMs, such as creation of VMs, deletion of VMs, migration of VMs, and processing with respect to the guest OS as the accessible OS. For example, the management VM 17 identifies the guest OS as the accessible OS, in response to a user operation or the like, and controls either the guest (A) VM 18 or the guest (B) VM 19 that executes the identified guest OS, as the accessible OS. The management VM 17 has a display state management table 17a and a display state management/notification unit 17b.

Figure 3:
FIG. 3 illustrates an example of information stored in a display state management table.

The display state management table 17a is a table generated in a virtual memory area realized by assigning a predetermined area of the main storage unit 13a as a memory to be used by the hypervisor 16. The display state management table 17a records information indicating whether or not VMs whose display information is displayed may differ between the "Status Notification Area" and the "Operating Area". FIG. 3 illustrates an example of information stored in the display state management table 17a. The example in FIG. 3 is only illustrative. The information to be stored is not limited to this but may be set and changed arbitrarily.

As illustrated as FIG. 3, the display state management table 17a stores information regarding "Guest OS", "Next OS", and "Status Notification Area". The information stored here is updated by the display state management/notification unit 17b. The "Guest OS" indicates an OS which is executed as a virtual machine inside the mobile terminal 10 and which is a status displayed OS, i.e., an OS whose information is displayed in the "Status Notification Area". The "Next OS" indicates an OS which is executed as a virtual machine inside the mobile terminal 10 and which is the next status displayed OS, i.e., an OS whose information may be displayed next in the "Status Notification Area". The "Status Notification Area" indicates information indicating whether information in the status notification area of the guest OS is being displayed. When the information in the status notification area of the guest OS is currently being displayed, "Being displayed" is stored in the "Status Notification Area", and when the status notification area is not being currently displayed, "Display possible" is stored in the "Status Notification Area".

The upper drawing in FIG. 3 illustrates that currently, information in the status notification area of the guest OS (A) (depicted as "GUEST A" in the drawings) is being displayed on the display unit 11, and the OS whose information may be displayed next is the guest OS (B) (depicted as "GUEST B" in the drawings). When, in the state as illustrated as the upper drawing in FIG. 3, the status notification area of the guest OS (B) is displayed on the display unit 11, the "Status Notification Area" corresponding to the "Guest OS=Guest OS (B)" is updated to "Being displayed" as illustrated as the lower drawing in FIG. 3. Further, the "Status Notification Area" corresponding to the "Guest OS=Guest OS (A)" is updated to "Display possible".

The display state management/notification unit 17b is a processing unit executed within the management VM 17. For example, the display state management/notification unit 17b receives from the input control VM 22 a notification indicating that an "operation for viewing status" such as a "Menu" button click has been accepted. Then, the display state management/notification unit 17b recognizes that a "status notification area changing request" has occurred, and refers to the display state management table 17a. The display state management/notification unit 17b then determines a display layout including the operating area of the accessible OS and the status notification area of the status displayed OS, and outputs an instruction to change the display layout to a display area determining unit 20d.

For example, the display state management/notification unit 17b identifies a guest OS whose value in the "Status Notification Area" of the display state management table 17a is "Being displayed". Further, the display state management/notification unit 17b identifies the "Next OS" for the corresponding guest OS from the display state management table 17a. These OSs respectively correspond to the status displayed OS, and the next status displayed OS.

At this time, if it is determined that the status displayed OS is the same as the next status displayed OS, the display state management/notification unit 17b determines that display does not need to be changed, and ends processing. If the two guest OSs are different, the display state management/notification unit 17b updates the display state management table 17a so as to change the "Status Notification Area" for the status displayed OS to "Display possible", and change the "Status Notification Area" for the next status displayed OS to "Being displayed". Then, the display state management/notification unit 17b requests the display area determining unit 20*d* to change display layout. To specify the accessible OS and the status displayed OS, as a display layout changing request, the display state management/notification unit 17*b* acquires information regarding the accessible OS from the management VM 17 or the like, and transmits the information regarding the accessible OS and the information regarding the next status displayed OS as information regarding the accessible OS and information regarding the status displayed OS.

The guest (A) VM 18 is a virtual machine that executes the OS (A) as a guest OS. The guest (A) VM 18 has a display information generating unit 18*a*. For example, the guest (A) VM 18 generates a screen for processing provided by the guest OS (A), such as an email function, a call function, or a Web browsing function, and provides the generated screen to the user. As an example, upon accepting an email creation request from the user via the input control VM 22, the guest (A) VM 18 executes the email function, and instructs the display information generating unit 18*a* to generate a screen for sending/receiving an email. Also, upon being notified of reception of an incoming call from the call processing VM 23, the guest (A) VM 18 instructs the display information generating unit 18*a* to generate the incoming call screen.

The display information generating unit 18*a* is a processing unit that generates a screen designated from the guest (A) VM 18, and stores the generated screen into a frame buffer 20*b* of the display control VM 20. As a specific example, when a screen that may prompt a user operation, such as an email creation screen or a Web operation screen, is designated to be generated from the guest (A) VM 18, the display information generating unit 18*a* generates the designated screen, and outputs the generated screen to the "Operating Area" in the frame buffer 20*b*. When a screen that does not prompt a user operation, such as a screen displaying a change in radio wave intensity, a change in remaining battery level, or the like, is designated to be generated from the guest (A) VM 18, the display information generating unit 18*a* generates the designated screen, and outputs the generated screen to the "Status Notification Area" in the frame buffer 20*b*.

Since the guest (B) VM 19 is similar to the guest OS (A), a detailed description of the guest (B) VM 19 is omitted. Briefly explained, the guest (B) VM 19 is a virtual machine that executes the OS (B) as a guest OS. The guest (B) VM 19 has a display information generating unit 19*a*. For example, the guest (B) VM 19 generates a screen for processing provided by the guest OS (B), such as an email function, a call function, or a Web browsing function, and provides the generated screen to the user.

The display information generating unit 19*a* is a processing unit that generates a screen designated from the guest (B) VM 19, and stores the generated screen into a frame buffer 20*c* of the display control VM 20. As a specific example, when a screen that may prompt a user operation is designated to be generated from the guest (B) VM 19, the display information generating unit 19*a* generates the designated screen, and outputs the generated screen to the "Operating Area" in the frame buffer 20*c*. When a screen that does not prompt a user operation is designated to be generated from the guest (B) VM 19, the display information generating unit 19*a* generates the designated screen, and outputs the generated screen to the "Status Notification Area" in the frame buffer 20*c*.

The display control VM 20 is a virtual machine that has a display area table 20*a*, the frame buffer 20*b*, the frame buffer 20*c*, the display area determining unit 20*d*, and a display control unit 20*e*, thereby controlling display on the display unit 11.

The display area table 20*a* retains configuration information of the entire screen and the status notification area, for each guest OS. FIG. 4 illustrates an example of information stored in the display area table 20*a*. As illustrated as FIG. 4, the display area table 20*a* stores information regarding "Guest OS", "Entire Screen" which includes "Source Address", "Transfer Size", and "Destination Address", and "Status Notification Area" which includes "Rectangle Start Point" and "Rectangle Size".

The "Guest OS" indicates a guest OS that runs on a virtual machine within the mobile terminal 10. The "Entire Screen" indicates information for displaying a screen which may prompt a user operation on the entire display unit 11 in a case where direct memory access (DMA) is used. The "Source Address" indicates an address in a frame buffer from which to transfer screen data to the display unit 11, the "Transfer Size" indicates the size of the screen data to be transferred to the display unit 11, and the "Destination Address" indicates an address in the display unit 11 to which to transfer the screen data.

The "Status Notification Area" indicates information on a rectangle area for displaying a screen which does not prompt a user operation as a status notification area on the display unit 11. The "Rectangle Start Point" indicates coordinates of the start position of the status notification area on the display unit 11. The "Rectangle Size" indicates the size of the status notification area to be displayed on the display unit 11.

FIG. 4 illustrates that in the case of displaying a screen which may prompt a user operation for the guest OS (A) on the display unit 11, screen data of the size "ScreenSize" is transferred from the frame buffer 20*b* at an address "FB_A" to the display unit 11 at an address "Lcd_top". Also, FIG. 4 illustrates that in the case of displaying a screen which does not prompt a user operation for the guest OS (A) on the display unit 11, screen data stored in the "Status Notification Area" of the frame buffer 20*b* is displayed in an area of a size "StWa×StHa" which starts at coordinates "(StXa, StYa)" in the display unit 11.

Likewise, FIG. 4 illustrates that in the case of displaying a screen which may prompt a user operation for the guest OS (B) on the display unit 11, screen data of the size "ScreenSize" is transferred from the frame buffer 20*c* at an address "FB_B" to the display unit 11 at an address "Lcd_top". Also, in the case of displaying a screen which does not prompt a user operation for the guest OS (B) on the display unit 11, the following processing is executed. That is, FIG. 4 illustrates that screen data stored in the "Status Notification Area" of the frame buffer 20*c* is displayed in a rectangular area of a size "StWb×StHb" which starts at coordinates "(StXb, StYb)" in the display unit 11.

Returning to FIG. 2, the frame buffer 20*b* is a storage area that has the "Status Notification Area" and the "Operating Area" described above, and stores information generated by the display information generating unit 18*a* of the guest (A) VM 18. The display information generating unit 18*a* stores a screen which does not prompt a user operation in the "Status Notification Area", and stores a screen which may prompt a user operation in the "Operating Area". Likewise, the frame buffer 20*c* is a storage area that has the "Status Notification Area" and the "Operating Area" described above, and stores information generated by the display information generating unit 19*a* of the guest (B) VM 19.

The display area determining unit 20*d* is a processing unit that determines the area of the screen to be displayed on the display unit 11. Specifically, the display area determining unit 20*d* receives an instruction to change the display layout including the operating area of the accessible OS and the status notification area of the status displayed OS from the display state management/notification unit 17*b*, and determines the layout to be displayed on the screen. Then, the display area determining unit 20*d* outputs an instruction to display according to the determined layout, to the display control unit 20*e* within the display control VM 20.

For example, upon receiving a display layout changing request from the display state management/notification unit 17*b*, the display area determining unit 20*d* extracts information on the accessible OS and the status displayed OS from this request. Subsequently, the display area determining unit 20*d* refers to the display area table 20*a*, and acquires parameters of "Entire Screen" for the accessible OS. Further, the display area determining unit 20*d* compares the information on the accessible OS and the information on the status displayed OS with each other. If both pieces of information indicate the same OS, the display area determining unit 20*d* makes a display request to the display control unit 20*e* while including the parameters of "Entire Screen" previously acquired in the request.

As an example, suppose that the accessible OS and the status displayed OS are both the guest OS (A). In this case, the display area determining unit 20*d* outputs, to the display control unit 20*e*, an instruction to output the screen of the entire area of the frame buffer 20*b*, that is, the "Status Notification Area" plus the "Operating Area". At this time, the display control unit 20*e* refers to "Guest A" in the display area table 20*a*, and outputs a source address "FB_A", a transfer size "ScreenSize", and a destination address "Lcd_top" as display parameters to the display control unit 20*e*.

If the information on the accessible OS and the information on the status displayed OS indicate different OSs, the display area determining unit 20*d* acquires parameters of "Status Notification Area" for the status displayed OS. Subsequently, the display area determining unit 20*d* determines the parameters passed to the display control unit 20*e* and makes a display request to the display control unit 20*e* so that the resulting display layout is such that the "Entire Screen" is overwritten with the "Status Notification Area".

As an example, suppose that the accessible OS is the guest OS (A) and the status displayed OS is the guest OS (B). In this case, the display area determining unit 20*d* outputs, to the display control unit 20*e*, an instruction to display the screen of the "Status Notification Area" in the frame buffer 20*c*. At this time, the display area determining unit 20*d* refers to "Guest B" in the display area table 20*a* to acquire the data of "Rectangle Start Point" and "Rectangle Size", and outputs the acquired data of "Rectangle Start Point" and "Rectangle Size" as display parameters to the display control unit 20*e*.

The display control unit 20*e* is a processing unit that reads screen data from the frame buffer 20*b* or the frame buffer 20*c*, and displays the screen on the display unit 11. For example, suppose that the display control unit 20*e* has received an instruction to display the entire area, and display parameters "Source Address=FB_A, Transfer Size=ScreenSize, Destination Address=Lcd_top" from the display area determining unit 20*d*.

In this case, the display control unit 20*e* acquires, from the frame buffer 20*b*, screen data of a transfer size "ScreenSize" which starts at an address "FB_A" in the frame buffer 20*b*. Then, the display control unit 20*e* displays the screen in an area beginning from the address "Lcd_top" in the display unit 11. As a result, the display control unit 20*e* may display the screen of the guest OS (A) that is the accessible OS, on the entire screen of the display unit 11.

Also, suppose that the display control unit 20*e* has received an instruction to output the screen of the "Status Notification Area" in the frame buffer 20*c*, and display parameters "Rectangle Start Point, Rectangle Size" from the display area determining unit 20*d*. In this case, the display control unit 20*e* acquires screen data from the "Status Notification Area" in the frame buffer 20*c*, and displays the screen in a rectangular area of a size "StWb×StHb" which starts at coordinates "StXb, StYb" in the display unit 11. As a result, the display control unit 20*e* may display the status notification screen of the guest OS (B) in the "Status Notification Area" of the display unit 11, while displaying the screen of the guest OS (A) in the "Operating Area" of the display unit 11.

Returning to FIG. 2, the auxiliary storage VM 21 is a virtual machine that divides the auxiliary storage unit 13*b* that is an auxiliary storage area into predetermined areas, and assigns the divided areas to individual VMs to thereby provide each VM with a dedicated auxiliary storage area.

The input control VM 22 is a virtual machine that notifies each VM of a user operation accepted by the input control unit 12. For example, the input control VM 22 has an operation identifying unit 22*a* to identify the kind of a user operation accepted by the input control unit 12 and notify the corresponding VM of the identified user operation.

The operation identifying unit 22*a* is a processing unit that identifies a user operation and notifies each VM of the identified user operation. For example, when a call operation such as a "Call" button click is accepted by the input control unit 12, the operation identifying unit 22*a* notifies the call processing VM 23 of this operation. When a display switching request such as a "Menu" button click, that is, an "operation for viewing status" is accepted by the input control unit 12, the operation identifying unit 22*a* notifies the management VM 17 or the like of the acceptance of this operation.

The call processing VM 23 is a virtual machine that executes call processing or the like in cooperation with the call processing unit 14 in accordance with a user operation for the guest (A) VM 18 or the guest (B) VM 19, thereby establishing a call with another apparatus. Although the call processing VM 23 is a virtual machine, the call processing VM 23 executes processing similar to the call processing function installed in a typical cell-phone or the like.

[Flow of Processing]

Figure 5:
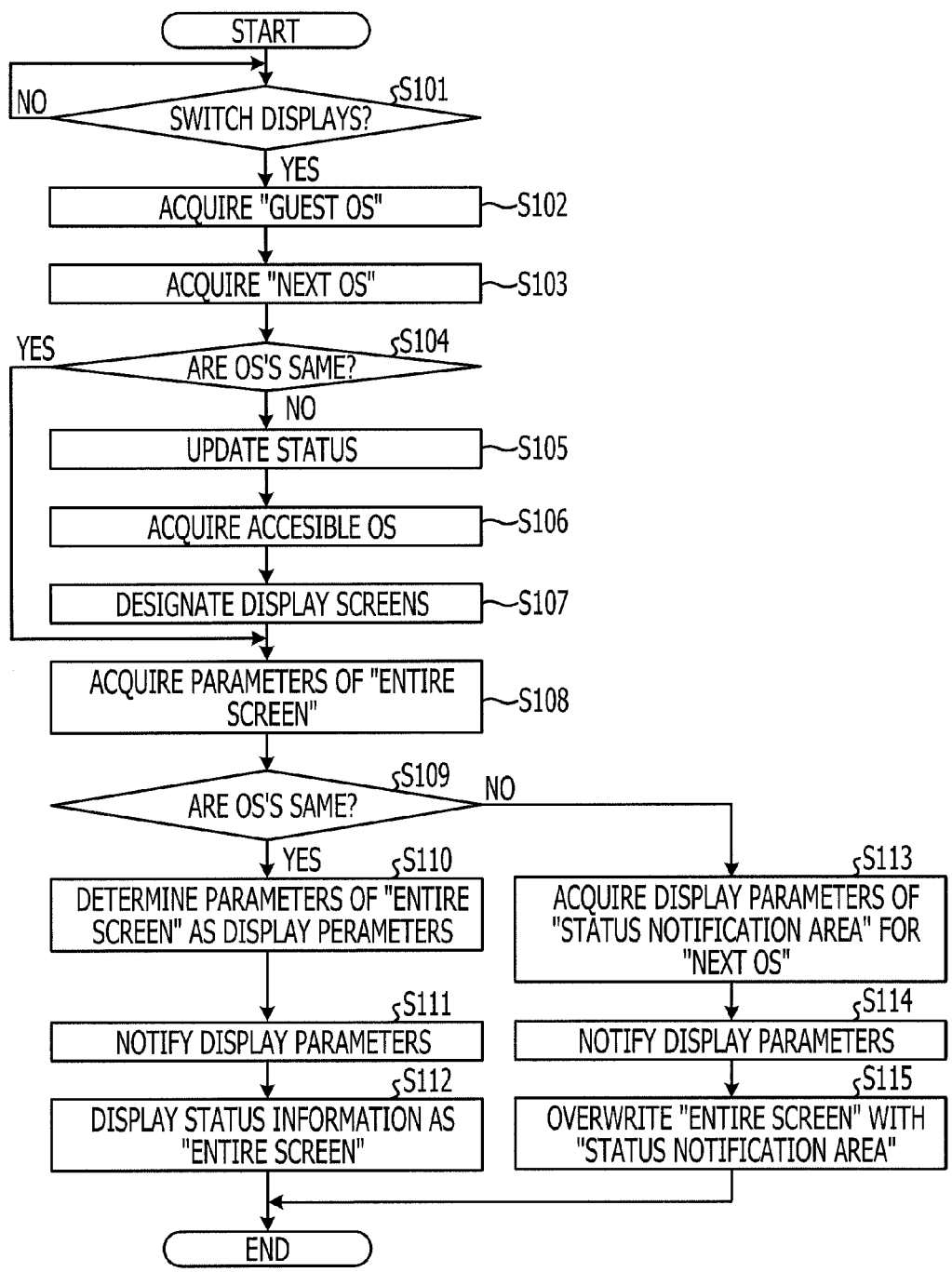
FIG. 5 is a flowchart illustrating a flow of processing executed by a mobile terminal.

FIG. 5 is a flowchart illustrating the flow of processing executed by the mobile terminal 10.

In S101, the operation identifying unit 22*a* of the input control VM 22 waits for receiving a display switching request.

In S102, when the operation identifying unit 22*a* receives a display switching request (S101: Yes), the display state management/notification unit 17*b* of the management VM 17 refers to the display state management table 17*a*, and acquires the information regarding "Guest OS" for which "Status Notification Area" is "Being displayed".

In S103, the display state management/notification unit 17*b* refers to the display state management table 17*a*, and acquires the information regarding "Next OS" of which the "Status Notification Area" is "Display possible".

In S104, the display state management/notification unit 17*b* determines whether or not the "Guest OS" and the "Next OS" are the same.

In S105, if it is determined that the two OSs are not the same (S104: No), the display state management/notification unit 17*b* updates the status of each of "Being displayed" and "Display possible" in the "Status Notification Area". Specifically, the display state management/notification unit 17*b* updates the "Status Notification Area" for the "Guest OS" acquired in S102 to "Display possible". Further, the display state management/notification unit 17*b* updates the "Status Notification Area" for the "Next OS" acquired in S103 to "Being displayed".

In S106, the display state management/notification unit 17b acquires the information regarding "accessible OS" from information managed in an internal memory or the like.

In S107, the display state management/notification unit 17b outputs to the display area determining unit 20d an instruction to display the screen of the "accessible OS" in the "Operating Area", and the screen of the "Next OS" in the "Status Notification Area".

If it is determined in S104 that the two OSs are the same (S104: Yes), the mobile terminal 10 advances the process to S108 without executing S105 to S107.

In S108, The display area determining unit 20d refers to the display area table 20a, and acquires display parameters of "Entire Screen" for the "accessible OS" notified from the display state management/notification unit 17b.

In S109, the display area determining unit 20d determines whether or not the "accessible OS" and the "Next OS" are the same on the basis of the information notified from the display state management/notification unit 17b.

If it is determined that the "accessible OS" and the "Next OS" are the same (S109: Yes), the display area determining unit 20d executes S110 to S112. That is, if it is determined that the accessible OS whose screen is to be displayed in the "Operating Area", and the OS whose screen is to be displayed in the "Status Notification Area" are the same, the display area determining unit 20d executes S110 to S112.

In S110, the display area determining unit 20d acquires parameters of "Entire Screen" corresponding to the "accessible OS" from the display area table 20a, and determines the acquired parameters as display parameters.

In S111, the display area determining unit 20d notifies the display control unit 20e of the determined display parameters.

In S112, the display control unit 20e acquires screen data from the frame buffer 20b or the frame buffer 20c in accordance with the notified display parameters, and displays the screen on the display unit 11 in accordance with the notified display parameters.

On the other hand, if it is determined that the "accessible OS" and the "Next OS" are not the same (S109: No), the display area determining unit 20d executes S113 to S115. That is, if it is determined that the accessible OS whose screen is to be displayed in the "Operating Area", and the OS whose screen is to be displayed in the "Status Notification Area" are not the same, the display area determining unit 20d executes S113 to S115.

In S113, the display area determining unit 20d acquires parameters of "Status Notification Area" corresponding to the "Next OS" from the display area table 20a, and determines the acquired parameters as display parameters.

In S114, the display area determining unit 20d notifies the display control unit 20e of the determined display parameters.

In S115, the display control unit 20e acquires screen data from the frame buffer 20b or the frame buffer 20c in accordance with the notified display parameters, and displays the screen in the "Status Notification Area" of the display unit 11 in accordance with the notified display parameters. At this time, for example, the display control unit 20e arranges the screen data acquired from the frame buffer 20b or the frame buffer 20c in such a way as to overwrite a screen area that overlaps the currently displayed "Status Notification Area".

Advantageous Effects of First Embodiment

In this way, when the user makes an "operation for viewing status", the mobile terminal 10 according to first embodiment may instruct that the OS to be displayed in the operating area and the OS to be displayed in the status notification area be different OSs. As a result, it is possible for the mobile terminal 10 to synthesize and display an area for another OS only in the status notification area, without switching the accessible OS.

Also, the mobile terminal 10 according to first embodiment may prompt the user to confirm in advance whether or not to perform a process of changing the accessible OS, before the user performs the changing process, thereby enhancing user convenience. Further, since the mobile terminal 10 according to first embodiment obviates introduction of a special program onto the higher level guest OS, and is relatively unaffected even when the OS is changed, it is also possible to reduce developer cost.

Second Embodiment

As a technique for the mobile terminal 10 to display a screen on the display unit 11, various techniques may be employed, such as a technique using coordinate axes or DMA. Specifically, in the display area table 20a, the mobile terminal 10 may manage the areas such as "Entire Screen", "Operating Area", and "Status Notification Area" by coordinate axes.

The mobile terminal 10 may also be configured to associate each of the frame buffers 20b and 20c of the display control VM 20 with the display unit 11 in advance, and transfer image data of the screen stored in the frame buffer 20b or 20c to the display unit 11. Accordingly, in second embodiment, an example in which the mobile terminal 10 uses DMA to transfer screen data stored in the frame buffer 20b or 20c to the display unit 11 is described with reference to FIGS. 6 and 7.

Figure 7:
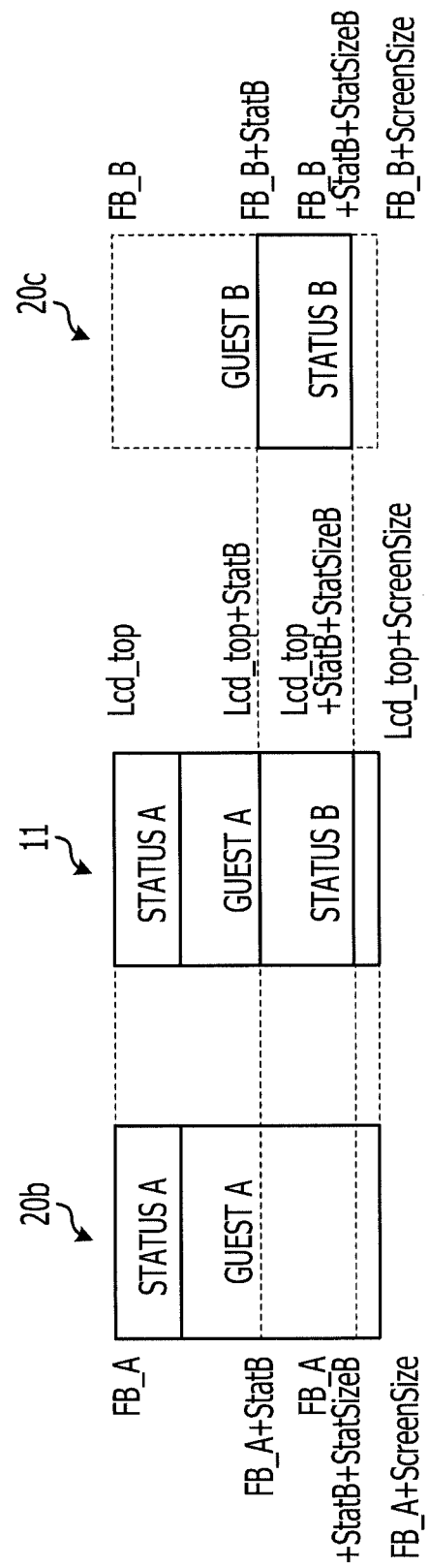
FIG. 7 illustrates an example of screen data transfer in a case where DMA is used.

FIG. 6 illustrates an example of information stored in the display area table 20a according to second embodiment. FIG. 7 illustrates an example of screen data transfer in a case where DMA is used. Like as in FIG. 4, the display area table 20a stores information regarding "Guest OS", "Entire Screen", and "Status Notification Area" in association with each other as illustrated as FIG. 6.

FIG. 6 illustrates that in the case of displaying a screen which may prompt a user operation on the guest OS (A) on the display unit 11, screen data of the size "ScreenSize" is transferred from the frame buffer 20b at an address "FB_A" to the display unit 11 at an address "Lcd_top". FIG. 6 also illustrates that in the case of displaying a screen which does not prompt a user operation on the guest OS (A) on the display unit 11, screen data of the size "StatSizeA" is transferred from the frame buffer 20b at an address "FB_A+StatA" to the display unit 11 at an address "Lcd_top+StatA".

Likewise, FIG. 6 illustrates that in the case of displaying a screen which may prompt a user operation on the guest OS (B) on the display unit 11, screen data of the size "ScreenSize" is transferred from the frame buffer 20c at an address "FB_B" to the display unit 11 at an address "Lcd_top". FIG. 6 also illustrates that in the case of displaying a screen which does not prompt a user operation on the guest OS (B) on the display unit 11, screen data of the size "StatSizeB" is transferred from the frame buffer 20c at an address "FB_B+StatB" to the display unit 11 at an address "Lcd_top+StatB".

Subsequently, referring to FIG. 7, a description is given of an example in which the entire screen of the guest OS (A) and the status notification area of the guest OS (B) are displayed in the state illustrated as FIG. 6. As illustrated as FIG. 7, if StatB is not equal to zero, the display control unit 20e transfers screen data of the size StatB from an address FB_A in the frame buffer 20b to an area of the display unit 11 which begins from an address Lcd_top. Subsequently, the display control unit 20e transfers screen data of the size StatSizeB from an address FB_B+StatB in the frame buffer 20c to an area of the display unit 11 which begins from an address Lcd_top+StatB. Subsequently, if StatB+StatSizeB is not equal to ScreenSize, the display control unit 20e performs the following control. Specifically, the display control unit 20e transfers screen data of the size ScreenSize−(StatB+StatSizeB) from an address FB_A+StatB+StatSizeB in the frame buffer 20b to an area of the display unit 11 which begins from an address Lcd_top+ StatB+StatSizeB.

In this way, for the portion other than the status notification area, the entire screen of the accessible OS is transferred as a source, and only for the portion of this status notification area, it is possible to transfer a portion corresponding to the status notification area within the screen of the OS for which the status notification area is to be displayed.

Third Embodiment

Next, referring to FIGS. 8 to 12, various specific examples of how to switch the operating area and the status notification area are described.

First Specific Example

Figure 9:
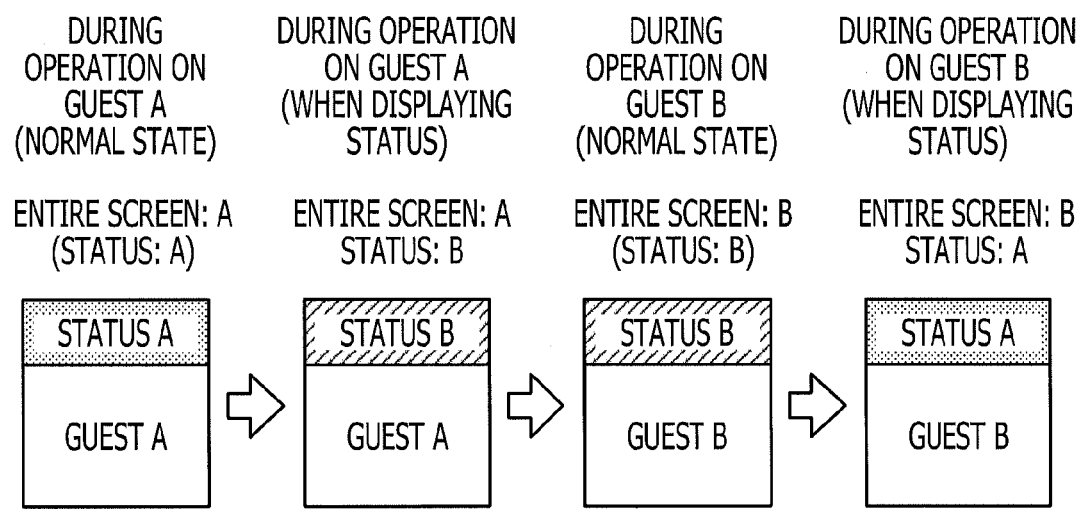
FIG. 9 illustrates an example of switching of screens in a case where status notification areas of guest OSs are the same in size.

FIG. 8 illustrates an example of the display area table 20a in a case where the status notification areas of guest OSs are the same in size. FIG. 9 illustrates an example of switching of screens in a case where the status notification areas of guest OSs are the same in size.

As illustrated as FIG. 8, the display area table 20a stores "Guest A", ("FB_A", "ScreenSize", and "Lcd_top"), and ("FB_A", "StatSize", and "Lcd_top") as information regarding "Guest OS", "Entire Screen", and "Status Notification Area", respectively. Likewise, the display area table 20a stores "Guest B", ("FB_B", "ScreenSize", and "Lcd_top"), and ("FB_B", "StatSize", and "Lcd_top").

A description is given here on an example in which the status notification areas of the guest OS (A) and guest OS (B) are the same in both position and size. In this case, for example, the display control unit 20e transfers screen data of the size StatSize from an address FB_A in the frame buffer 20b to an area of the display unit 11 which begins from an address Lcd_top. Also, the display control unit 20e transfers screen data of the size ScreenSize−StatSize from an address FB_B+StatSize in the frame buffer 20c to an area of the display unit 11 which begins from an address Lcd_top+Statsize.

Specifically, as illustrated as FIG. 9, when the mobile terminal 10 accepts a display request for the status notification area of the guest OS (B) while the guest OS (A) is being operated on, the mobile terminal 10 displays the status notification screen of the guest OS (B) on the screen of the guest OS (A). Thereafter, upon accepting a display request for the status notification area of the guest OS (A) while the guest OS (B) is being operated on, the mobile terminal 10 displays the status notification screen of the guest OS (A) on the screen of the guest OS (B). In this way, even when the guest OS as the accessible OS and the guest OS for the status notification area are switched, the mobile terminal 10 may display information without changing its position and size of the status notification area.

Second Specific Example

Figure 11:
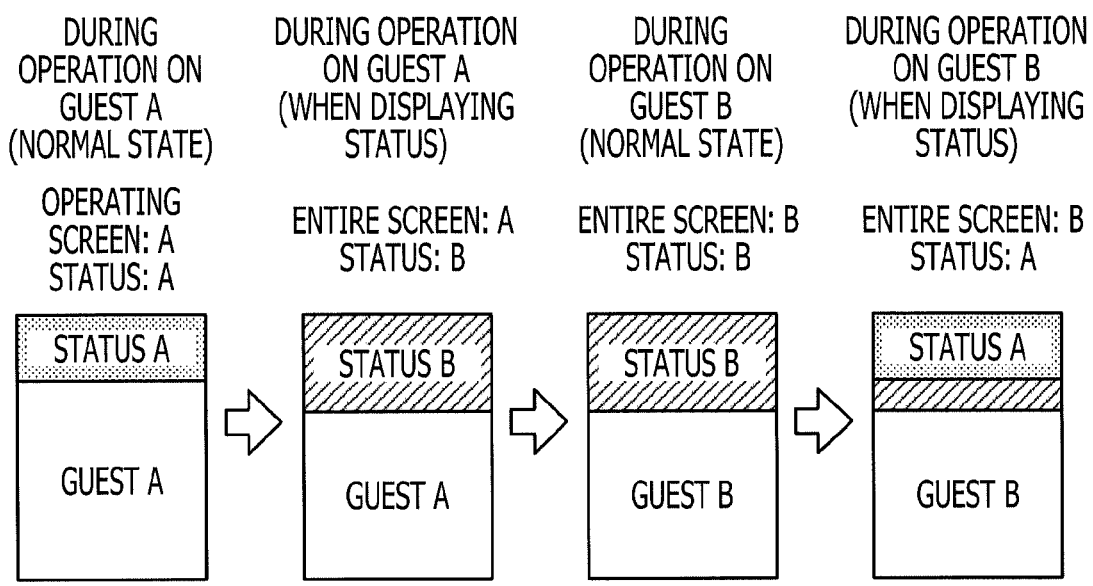
FIG. 11 illustrates an example of switching of screens in a case where status notification areas of guest OSs are different in size.

FIG. 10 illustrates an example of the display area table 20a in a case where the status notification areas of guest OSs are different in size. FIG. 11 illustrates an example of switching of screens in a case where the status notification areas of guest OSs are different in size.

As illustrated as FIG. 10, the display area table 20a stores "Guest A", ("FB_A", "ScreenSize", and "Lcd_top"), and ("FB_A", "StatSizeA", and "Lcd_top") as information regarding "Guest OS", "Entire Screen", and "Status Notification Area", respectively. Likewise, the display area table 20a stores "Guest B", ("FB_B", "ScreenSize", and "Lcd_top"), and ("FB_B", "StatSizeB", and "Lcd_top").

A description is given here on an example in which the status notification areas of the guest OS (A) and guest OS (B) are the same in display position but different in display size. In this case, for example, the display control unit 20e transfers screen data of the size StatSizeA from an address FB_A in the frame buffer 20b to an area of the display unit 11 which begins from an address Lcd_top. Also, the display control unit 20e transfers screen data of the size ScreenSize−StatSizeA from an address FB_B+StatSizeA in the frame buffer 20c to an area of the display unit 11 which begins from an address Lcd_top+StatsizeA.

Specifically, as illustrated as FIG. 11, when the mobile terminal 10 accepts a display request for the status notification area of the guest OS (B) while the guest OS (A) is being operated on, the mobile terminal 10 displays the status notification screen of the guest OS (B) on the screen of the guest OS (A). At this time, in the mobile terminal 10, the status notification area (B) of the guest OS (B) is larger than the status notification area (A) of the guest OS (A), and thus the operating area (A) of the guest OS (A) becomes smaller.

Thereafter, upon accepting a display request for the status notification area of the guest OS (A) while the guest OS (B) is being operated on, the mobile terminal 10 displays the status notification screen of the guest OS (A) on the screen of the guest OS (B). At this time, in the mobile terminal 10, the status notification area (A) of the guest OS (A) is smaller than the status notification area (B) of the guest OS (B), and thus the status notification area (B) of the guest OS (B) remains on the screen. This remaining status notification area (B) may be left as it is, or may be set to another screen or the like. In this way, the mobile terminal 10 may display information while switching between the guest OS as the accessible OS and the guest OS for the status notification area, even when the status notification areas of these guest OSs are different in size.

Third Specific Example

Figure 13:
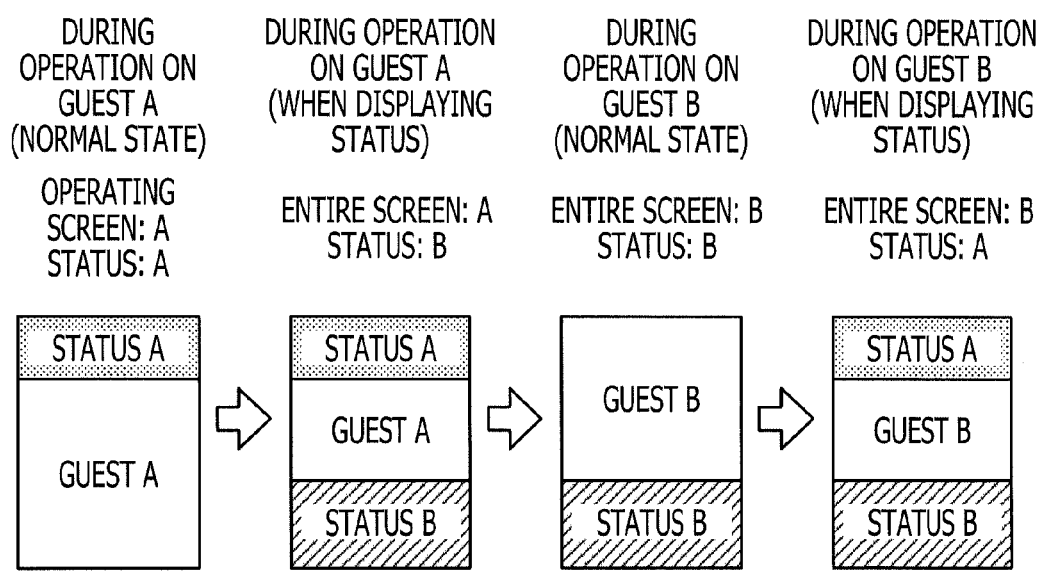
FIG. 13 illustrates an example of switching of screens in a case where status notification areas of guest OSs are different in both position and size.

FIG. 12 illustrates an example of the display area table 20a in a case where the status notification areas of guest OSs are different in both position and size. FIG. 13 illustrates an example of switching of screens in a case where the status notification areas of guest OSs are different in both position and size.

As illustrated as FIG. 12, the display area table 20a stores "Guest A", ("FB_A", "ScreenSize", and "Lcd_top"), and ("FB_A", "StatSizeA", and "Lcd_top")" as information regarding "Guest OS", "Entire Screen", and "Status Notification Area", respectively. Likewise, the display area table 20a stores "Guest B", ("FB_B", "ScreenSize", and "Lcd_top"), and ("FB_B+ScreenSize−StatSizeB", "StatSizeB", and "Lcd_top+ScreenSize−StatSizeB").

A description is given here on an example in which the status notification areas of the guest OS (A) and guest OS (B) are different in both display position and display size. In this case, the display control unit 20e does not execute transfer of the portion of the operating area (A) of the guest OS (A) corresponding to the status notification area (B) of the guest OS (B). For example, the display control unit 20e transfers screen data of the size StatSizeA from an address FB_A in the frame buffer 20b to an area of the display unit 11 which begins from an address Lcd_top. Also, the display control unit 20e transfers screen data of the size StatSizeB from an address FB_B+ScreenSize−StatSizeB in the frame buffer 20c to an area of the display unit 11 which begins from an address Lcd_top+ScreenSize−StatsizeB.

Specifically, suppose that as illustrated as FIG. 13, the mobile terminal 10 accepts a display request for the status notification area of the guest OS (B) while the guest OS (A) is being operated on. Then, the mobile terminal 10 displays the status notification area (B) of the guest OS (B) at a position different from the status notification area (A) on the screen of the guest OS (A). As an example, the mobile terminal 10 displays the status notification area (A) of the guest OS (A) in an upper part of the display unit 11, and displays the status notification area (B) of the guest OS (B) in a lower part of the display unit 11. That is, the mobile terminal 10 displays both the status notification area (A) and the status notification area (B) on the display unit 11 while the guest OS (A) is being operated on.

Thereafter, suppose that the mobile terminal 10 becomes a state in which the mobile terminal 10 is displaying the operating area (B) of the guest OS (B) while displaying the status notification area (B) in a lower part of the display unit 11, that is, a state in which the guest OS (B) is being operated on. In this state, when the mobile terminal 10 accepts a display request for the status notification area (A) of the guest OS (A), the mobile terminal 10 displays the status notification screen (A) of the guest OS (A) above the screen of the guest OS (B). That is, the mobile terminal 10 displays both the status notification area (A) and the status notification area (B) on the display unit 11 while the guest OS (B) is being operated on. In this way, the mobile terminal 10 may display the guest OS as the accessible OS and the guest OS for the status notification area while switching between these guest OSs, even when the status notification areas of these guest OSs are different in size and position.

Fourth Embodiment

While the embodiments have been described above, various embodiments may be employed other than the above-mentioned embodiments. Different embodiments are described below.

(Display Switching Operation)

The above embodiments are directed to an example in which when a specific user operation such as the "Menu" button click is accepted, the screen of the guest OS being operated is displayed while the screen of another guest OS is displayed for the status notification area. Thereafter, when the mobile terminal 10 accepts a "guest OS switching operation", the mobile terminal 10 may switch the operating screen of the guest OS as the accessible OS to the screen of the guest OS whose information is being displayed in the status notification area.

As an example, when the mobile terminal 10 accepts a specific user operation such as the "Menu" button click while displaying the operating screen (A) and status notification screen (A) of the guest OS (A), the mobile terminal 10 switches the status notification screen (A) to the status notification screen (B) of the guest OS (B). That is, at this point in time, the mobile terminal 10 displays the operating screen (A) of the guest OS (A) and the status notification screen (B) of the guest OS (B) on the display unit 11. Thereafter, upon accepting a specific user operation such as the "Menu" button double-click, the mobile terminal 10 switches the operating screen (A) of the guest OS (A) to the operating screen (B) of the guest OS (B). That is, the mobile terminal 10 displays information about the guest OS (B) on the entire screen of the display unit 11, by displaying the operating screen (B) of the guest OS (B) and the status notification screen (B) of the guest OS (B) on the display unit 11. As for a user operation for instructing to switch displays, the above-mentioned operation is merely an example and not limitative.

(Cooperation with Touch Panel)

For example, in a case where the display unit 11 of the mobile terminal 10 is a touch panel, by running a touch panel VM within the mobile terminal 10, the above-mentioned switching operation may be also accepted by the touch panel. As an example, by managing the screen of the display unit 11 and display information in association with each other, upon accepting a touch panel operation, the mobile terminal 10 may identify the kind of the operation on the basis of the position where the operation is accepted. In this way, processing may be executed in a manner similar to the above-mentioned embodiments also in a case where a touch panel is used.

(Display Area Table)

The above-mentioned display area table 20a may be set and changed by the user in an arbitrary manner. For example, the display area table 20a may store parameters according to coordinates corresponding to the display unit 11, and may store address information in a case where DMA is used.

Information stored in the display area table 20a may be set and registered by the user, and may also be generated at the timing when each guest OS is activated. For example, in the case of the mobile terminal 10 not capable of executing addition or deletion of guest OSs, fixed values may be registered in advance. On the other hand, each guest OS may notify the display control VM 20 of its own status notification area, and the display control VM 20 thus may generate the display area table 20a.

When applying this configuration to the mobile terminal 10 in which screen layout is changed with the orientation of the housing or the orientation of the screen, information on screen orientation may be also added to the display area table 20a. For example, the display area table 20a may hold, for each guest OS, information on status notification area for each of display layouts individually, such as normal position, when rotated to the right by 90 degrees, and when rotated to the left by 90 degrees. In this way, even when display layout is changed in accordance with the movement of the housing of the mobile terminal 10, the status notification area may be synthesized and displayed.

(List Display)

Figure 14:
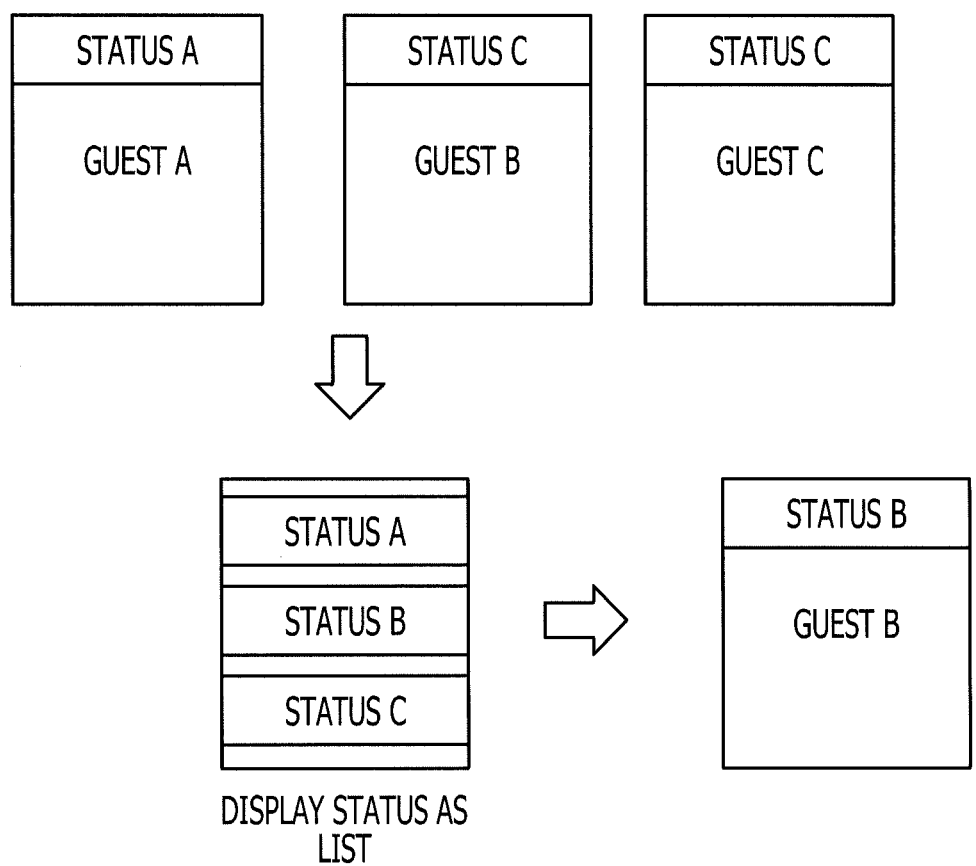
FIG. 14 illustrates list display of a plurality of status notification areas.

The mobile terminal 10 may allow a different user operation by using information retained by the display area table 20a. FIG. 14 illustrates list display of a plurality of status notification areas. Specifically, the mobile terminal 10 stores pieces of information about the status notification areas of individual guest OSs in the form of a table. When the mobile terminal 10 accepts an "operation for viewing status" from the user, the mobile terminal 10 may display the status notification areas of respective guest OSs in such a way that these status notification areas may be viewed simultaneously.

As an example, suppose that as illustrated as FIG. 14, the mobile terminal 10 is running a guest OS (A), a guest OS (B), and a guest OS (C), and has accepted a specific user operation such as clicking "Menu" button+"#", for example. In this case, the mobile terminal 10 displays a list of a status notification screen (A), a status notification screen (B), and a status notification screen (C) on the display unit 11. Thereafter, when the status notification screen (B) is selected by the user, the mobile terminal 10 displays information about the guest OS (B) on the entire display unit 11.

In this way, even when three or more guest OSs are installed, overviews of status notifications may be checked with only a few operations. Further, by defining the operation of selecting one of the listed status notification areas as an "operation for changing the accessible OS", processing from checking overviews of notifications to checking details of a specific notification may be implemented as a series of actions.

(System)

Among the processes described in the embodiments, the whole or part of the processes described as being performed automatically may be performed manually. Alternatively, the whole or part of the processes described as being performed manually may be performed automatically by methods according to the related art. Moreover, the processing steps, control steps, and specific names described above in this specification or illustrated in the drawings, for example, information including the various kinds of data and parameters illustrated as FIGS. 3, 4, and the like may be changed in an arbitrary manner unless otherwise specified.

The components of each apparatus or device illustrated in the drawings are functional and conceptual unless otherwise specified, and may not have to be physically configured as illustrated in the drawings. That is, the specific forms of distribution or integration of each apparatus or device are not limited to those illustrated in the drawings. In other words, the whole or part of each such apparatus or device may be configured so as to be functionally or physically distributed or integrated in arbitrary units in accordance with various loads, usage conditions, and so on. Further, the whole or an arbitrary part of each processing function executed in each apparatus or device may be implemented by a CPU and a program analyzed and executed by the CPU, or may be implemented as hardware by wired logic.

(Program)

The various processes described in the above-mentioned embodiments may be implemented by executing a program prepared in advance on a computer system such as a personal computer or a work station. Accordingly, the following describes an example of a computer system that executes a program having the same function as the above-mentioned embodiments.

Figure 15:
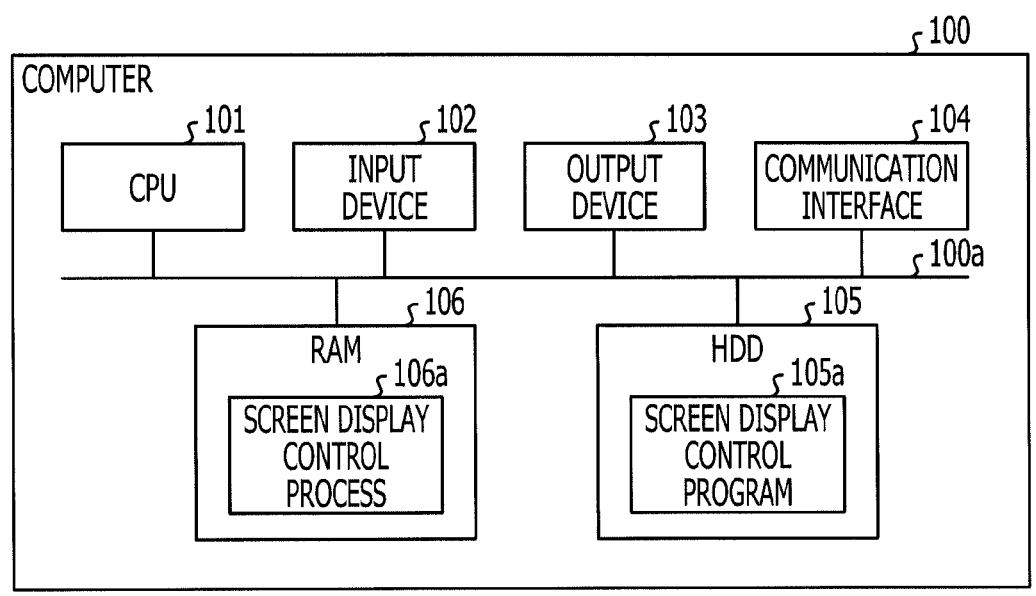
FIG. 15 illustrates an example of a hardware configuration of a computer that executes a screen display control program.

FIG. 15 illustrates an example of the hardware configuration of a computer that executes a screen display control program. As illustrated as FIG. 15, in a computer 100, a CPU 101, an input device 102, an output device 103, a communication interface 104, a hard disk drive (HDD) 105, and a RAM 106 are connected to a bus 100a.

The input device 102 is a mouse or a keyboard, for example. The output device 103 is a display device or the like. The communication interface 104 is an interface such as a network interface card (NIC). The HDD 105 stores information stored in a table or the like held by each of the VMs illustrated as FIG. 2, in addition to a screen display control program 105a. While the HDD 105 is given as an example of computer-readable medium, it is also possible to store various kinds of programs in another computer-readable medium such as a read only memory (ROM), a random access memory (RAM), a compact disc (CD), or CD-ROM, and have these programs read by the computer. It is also possible to place the computer-readable medium at a remote location, and have the computer access the computer-readable medium to acquire a program. At this time, the acquired program may be stored into the computer-readable medium in the computer itself and used.

By reading a screen display control program 105a and expanding the screen display control program 105a to the RAM 106, the CPU 101 runs the screen display control process 106a to execute the functions described with reference to FIG. 2 or the like. That is, the CPU 101 executes functions similar to the display state management/notification unit 17b, the display information generating unit 18a, the display information generating unit 19a, the display area determining unit 20d, the display control unit 20e, and so on illustrated as FIG. 2. In this way, the computer 100 acts as an information processing apparatus that executes a screen display control method by reading and executing a program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing a program that causes a computer to execute a procedure comprising:

dividing a display of a first virtual machine into a first display area and a second display area on a display unit;

starting the first virtual machine and a second virtual machine different from the first virtual machine, the first virtual machine and the second virtual machine executing different operating systems;

acquiring first display information about the first virtual machine, the first display information not prompting a user operation;

displaying the acquired first display information in the first display area on the display unit;

acquiring second display information about the first virtual machine, the second display information prompting a user operation;

displaying the acquired second display information in the second display area on the display unit;

determining, in response to an instruction for changing the first display information displayed in the first display area, whether mixed display is allowed by referencing status information indicating whether the mixed display is allowed, the mixed display being a display state in which the first display area and the second display area are configured to display information of different virtual machines executing different operating systems on the display unit;

acquiring, when the mixed display is allowed, third display information about the second virtual machine, the third display information not prompting a user operation; and reducing switching of the first virtual machine displayed in the second display area on the display unit by displaying the acquired third display information about the second virtual machine in the first display area on the display unit while displaying the acquired second display information about the first virtual machine in the second display area on the display unit.

2. The non-transitory computer-readable medium according to claim 1, wherein
- the computer further references display parameters indicating a rectangle area on the display unit, and
- the computer displays, on the display unit, the third display information in the rectangle area indicated by the display parameters.

3. The non-transitory computer-readable medium according to claim 2, wherein
- the computer stores the display parameters corresponding to each of different rotation amounts of the display unit,
- the computer further detects a rotation amount of the display unit, and
- the computer displays each piece of display information based on the display parameters corresponding to the detected rotation amount.

4. The non-transitory computer-readable medium according to claim 1, wherein
- the computer further references display parameters indicating a source address, a data size, and a destination address,
- the computer reads screen data of the data size from a storage area corresponding to the source address, and
- the computer displays the third display information on the display unit at a position corresponding to the destination address, based on the screen data.

5. The non-transitory computer-readable medium according to claim 4, wherein
- the computer stores the display parameters corresponding to each of different rotation amounts of the display unit,
- the computer further detects a rotation amount of the display unit, and
- the computer displays each piece of display information based on the display parameters corresponding to the detected rotation amount.

6. A mobile terminal comprising:
a display device; and
a processor to
- divide a display of a first virtual machine into a first display area and a second display area on the display device;
- start the first virtual machine and a second virtual machine different from the first virtual machine, the first virtual machine and the second virtual machine executing different operating systems,
- acquire first display information about the first virtual machine, the first display information not prompting a user operation,
- display the acquired first display information in the first display area on the display device,
- acquire second display information about the first virtual machine, the second display information prompting a user operation,
- display the acquired second display information in the second display area on the display device,
- determine, in response to an instruction for changing the first display information displayed in the first display area, whether mixed display is allowed by referencing status information indicating whether the mixed display is allowed, the mixed display being a display state in which the first display area and the second display area are configured to display information of different virtual machines executing different operating systems on the display device,
- acquire, when the mixed display is allowed, third display information about the second virtual machine, the third display information not prompting a user operation, and
- reduce switching of the first virtual machine displayed in the second display area by displaying the acquired third display information about the second virtual machine in the first display area on the display device while displaying the acquired second display information about the first virtual machine in the second display area on the display device.

\* \* \* \* \*